Figure 2:
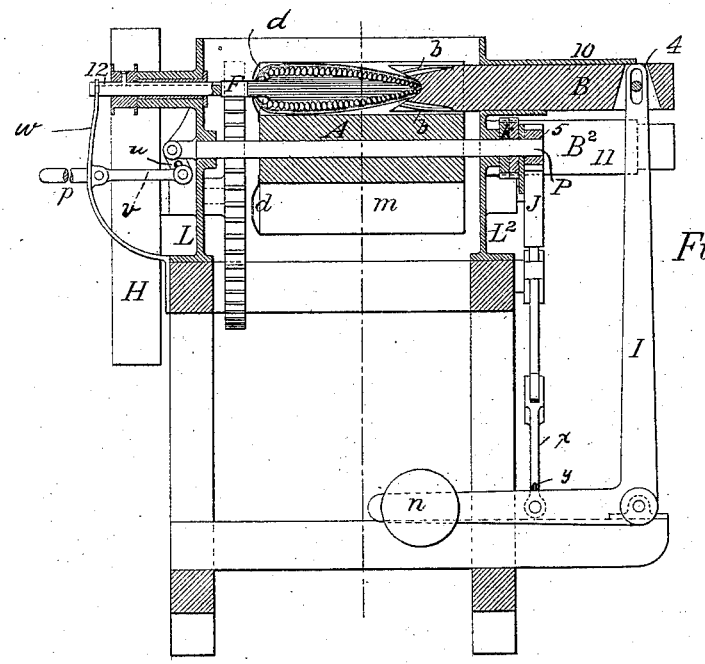

(No Model.) 5 Sheets—Sheet 1.

I. McKIM CHASE.
CORN HUSKING MACHINE.

No. 310,182. Patented Jan. 6, 1885.

Witnesses:
Geo. W. Wells.
Geo. H. Hall.

Inventor:
Isaac McKim Chase

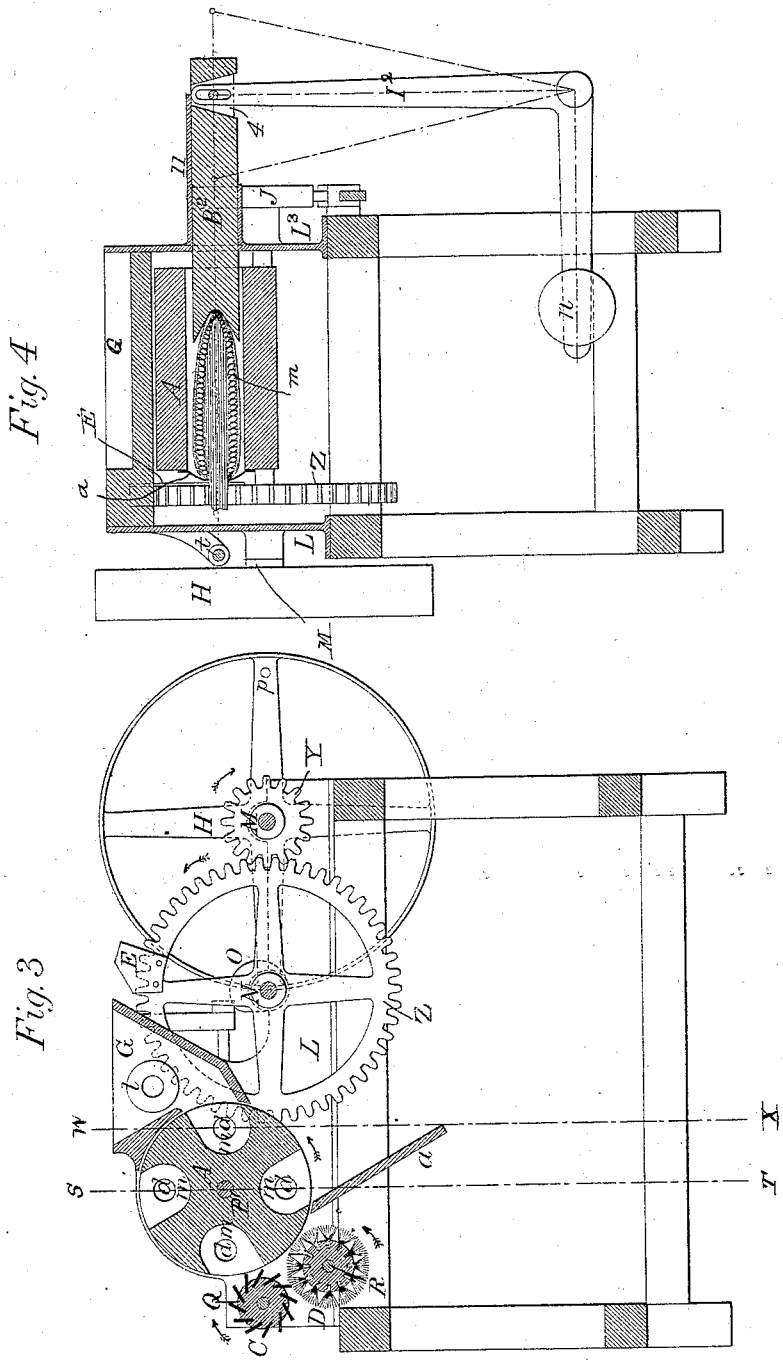

(No Model.)  5 Sheets—Sheet 3.

I. McKIM CHASE.
CORN HUSKING MACHINE.

No. 310,182. Patented Jan. 6, 1885.

Witnesses:

Inventor:
Isaac McKim Chase

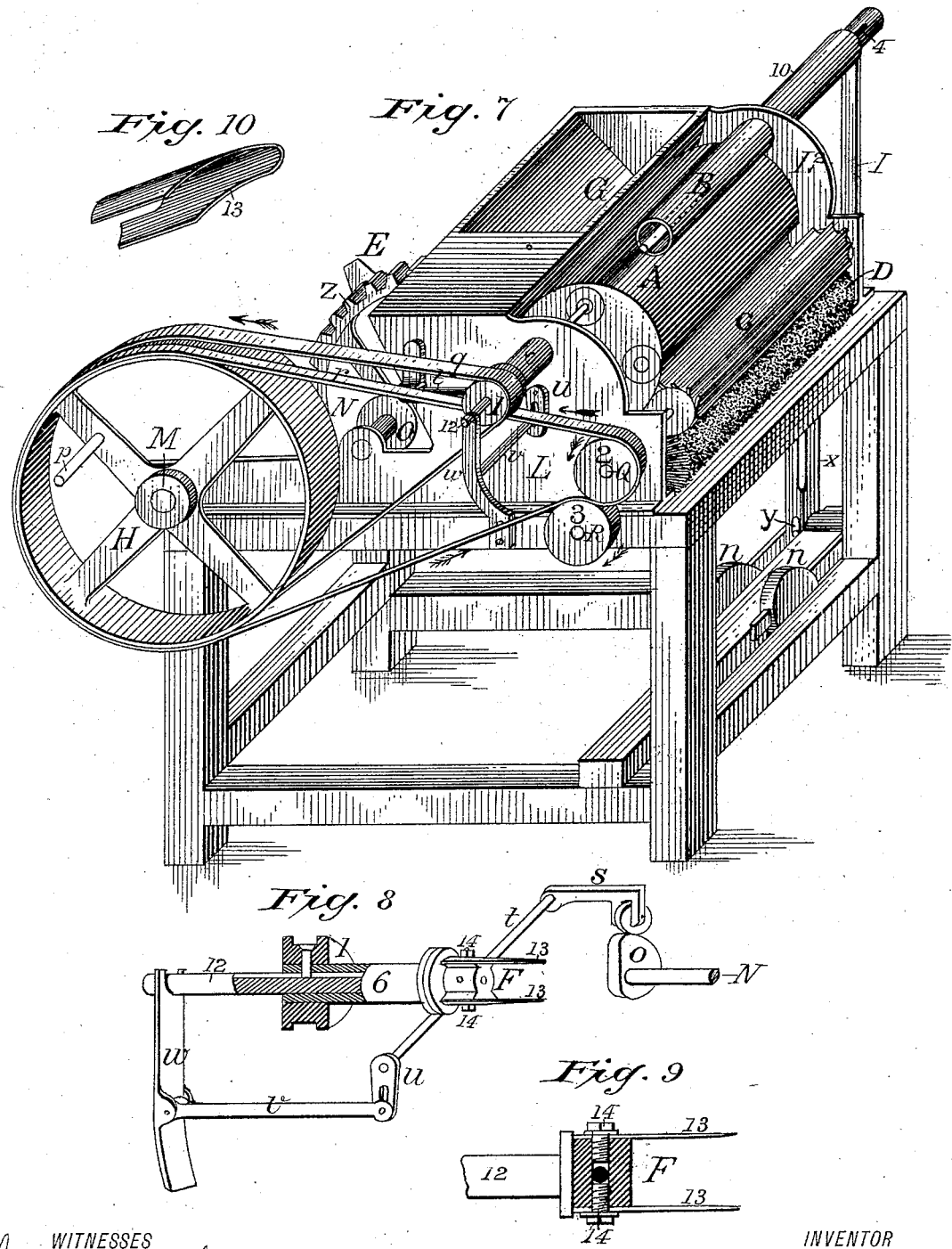

(No Model.) 5 Sheets—Sheet 5.
I. McKIM CHASE.
CORN HUSKING MACHINE.
No. 310,182. Patented Jan. 6, 1885.
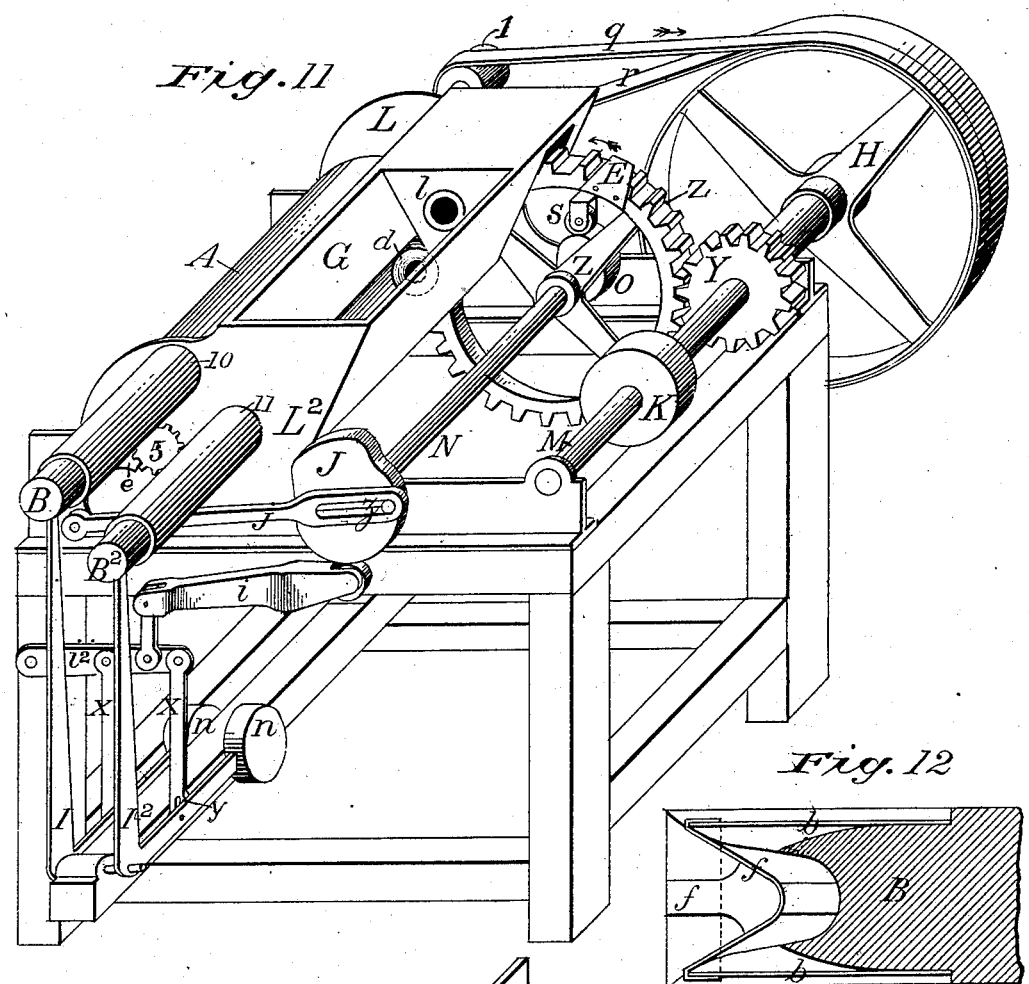
Fig. 11
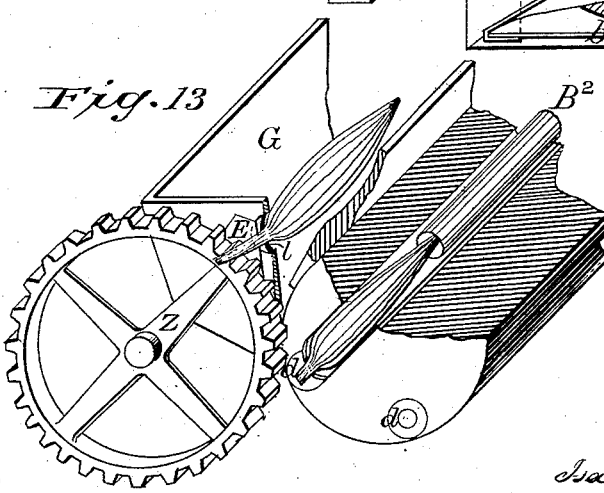
Fig. 12
Fig. 13
WITNESSES
INVENTOR
Isaac McKim Chase

UNITED STATES PATENT OFFICE.

ISAAC McKIM CHASE, OF WASHINGTON, DISTRICT OF COLUMBIA.

CORN-HUSKING MACHINE.

SPECIFICATION forming part of Letters Patent No. 310,182, dated January 6, 1885.

Application filed May 16, 1883. (No model.)

*To all whom it may concern:*

Be it known that I, ISAAC McKIM CHASE, of the city of Washington, in the District of Columbia, have invented an Improved Corn-Husking Machine, of which the following is a specification.

The object of my invention is to produce a machine that will automatically, rapidly, and effectively denude corn of its husks and discharge the husks and cleaned corn separately and in different directions.

One of the greatest difficulties heretofore experienced in corn-husking machines is that of making them automatic and effectively adapting them to the variable lengths and diameters to which the ears of corn grow. In my machine the concave shields to receive the butts, and the centering-bars to receive the points of the ears, enable it to readily adapt itself to any dimension within the range of the variation of the sizes of corn. Another difficulty encountered has been that of cutting the husk to separate it from the stem. In some machines the cut is made in a plane perpendicular to the axis of the ear to be cut; but this way will not effectively separate the husks from the stems without making the cut so far in as to remove some of the grain also. In other machines the cut is made by a cutter rotating about an axis on a line with that of the ear to be cut; but the human hand is depended upon to guide the ear of corn to the cutter, and, moreover, the crooked and varied stems met with in corn combine to make this an exceedingly slow and tedious way. In my machine I make two distinct cuts. In each case the ear is suspended at the butt and point by the hereinafter-described devices. The first or preparatory cut is made by a cutter rotating in a plane perpendicular to the axis of the ear to be cut, and by the aid of the perforated concave shield the cut is made on the stub beyond the juncture of the grain with the cob. For the final or under cut I employ a cutter rotating about an axis on a line with that of the ear to be operated upon. This cutter also has a reciprocating motion in the direction of its axis. This cutting effectively separates the husks from the stems, and by means of an adjustment the depth of cut is regulated so as to avoid contact with the grain. I designate the end of the machine where the driving-pulley K is situated as the "rear end," the side in which the center cutter, F, is journaled the "right side," and the side on which the centering-bars B B² are operated the "left side."

Figure 1:
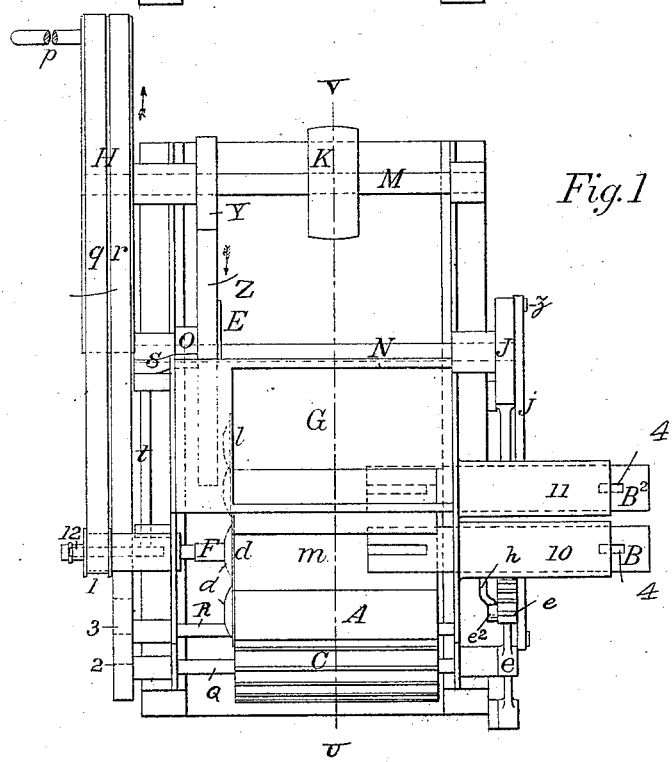
Figure 5:
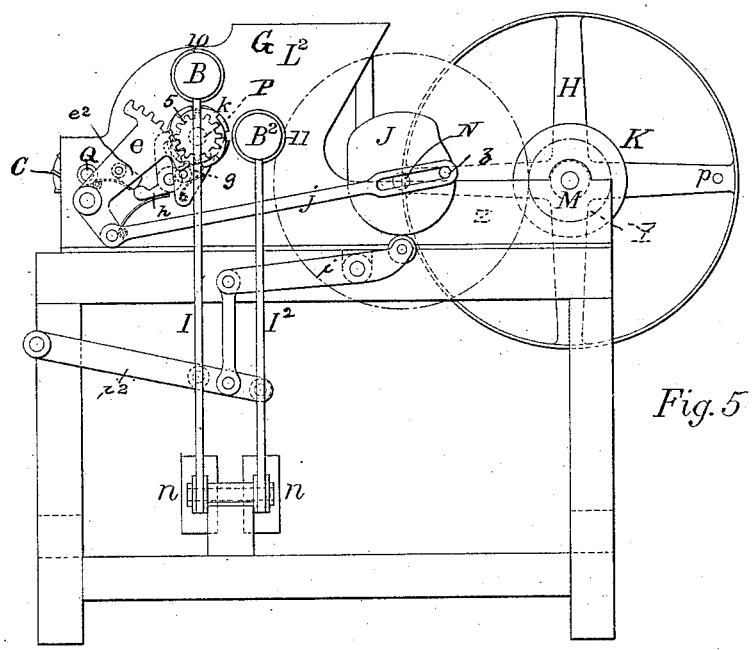
Figure 6:
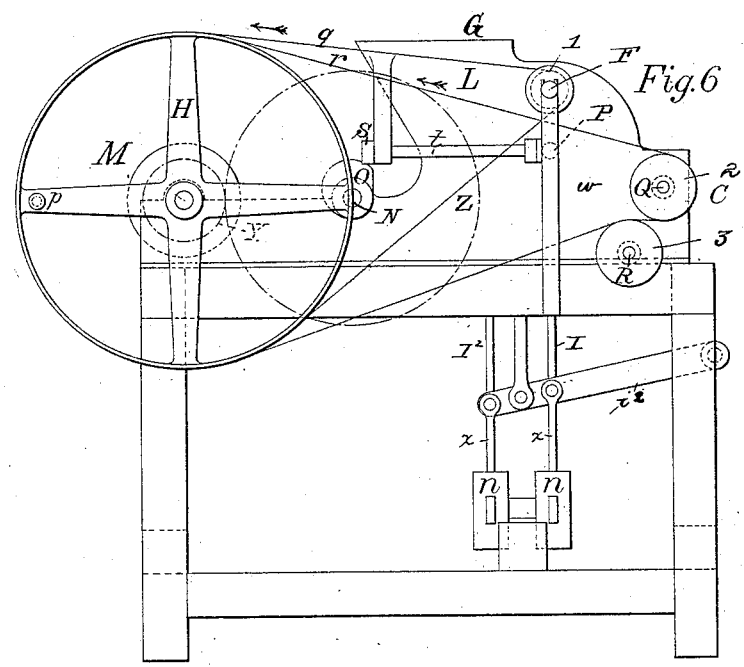

Figure 1 is a top view of the machine. Fig. 2 is a section on line S T, Fig. 3. Fig. 3 is a section on line U V, Fig. 1. Fig. 4 is a section on line W X, Fig. 3. Fig. 5 is a left-side elevation. Fig. 6 is a right-side elevation. Fig. 7 is a perspective view of machine, showing the arrangement of belts. Fig. 8 is a perspective view, partly in section, of mechanism for operating the center cutter with bearings removed. Fig. 9 shows means for securing the blades. Fig. 10 shows a blade of center cutter. Fig. 11 is a perspective view of the machine, showing the arrangement of centering-bars. Fig. 12 shows enlarged section of the end of the clasping centering-bar. Fig. 13 is a perspective view of certain parts of the machine, as hereinafter described.

L L² represent the metallic frames of the machine secured to a suitable frame-work of wood. In these frames are journaled a driving-shaft, M, a cam-shaft, N, a shaft, P, for grooved cylinder or carrying device A, a shaft, Q, for cleaning-cylinder C, and a shaft, R, for brush D. In frame L is journaled a center cutter, F. In frame L² are bearings 10 and 11, respectively, for centering-bars B and B². On the driving-shaft M is secured a pulley, K, for receiving power from any source. On the end of this shaft is also secured a pulley, H, for transmitting rotary motion through the belt $q$ to the center cutter, F, and through the belt $r$ to pulley 2 on shaft Q of cleaning-cylinder C, and pulley 3 on shaft R of brush D. The belt $q$ passes around pulley H and pulley 1, the latter being on the sleeve 6, through which the shaft 12 of center cutter, F, works. The belt $r$ passes around pulley H, over the top of pulley 3 on the end of shaft R of brush D, and around pulley 2 on the end of shaft Q of cleaning-cylinder C. On shaft M is secured a pinion, Y, gearing into a larger cog-wheel, Z, on the cam-shaft N. A handle, $p$, is attached to the pulley H, for the purpose of operating the machine by hand, if so desired. On one end of the shaft N is a cam, O, which raises lever s on the end of rod t. On the other end of rod t is a slotted crank, u, connected by a rod, v, to a spring, w. This spring is secured at its lower end to the frame-work of the machine. The upper end of spring w has a slot which embraces a neck on the shaft 12 of the center cutter, F. The slot in the crank u is for the purpose of regulating the extent of the reciprocating movement of center cutter, F, as hereinafter described.

The operation is this: The cam O raises the lever s, which motion is conveyed through rod t, crank u, rod v, to spring w, which is drawn in and moves the center cutter, F, with it. The resilition of the spring moves the cutter out when the diminished radius of the cam O is toward the lever s. On the opposite end of shaft N is a cam, J, for operating the bell-cranks I I$^2$ and revolving the cylinder or carrying device A. The lever i has a roller in one end which bears on the cam J. The other end of this lever is connected by a rod to lever i$^2$, which is pivoted at one end to the frame, and connected by rods x to bell-cranks I I$^2$. In the ends of rods x, connecting with the bell-cranks I I$^2$, are slots y, for the purpose of allowing the centering-bars to have variable strokes.

The mechanism operating the centering-bars is so proportioned that when the roller in the lever i bears on the largest part of cam J the centering-bars are thrown out sufficiently to allow cylinder A to revolve, and when the roller bears on the smaller part of the cam the ends of the bars are free to advance within about three inches of the shields d, consequently ears of that length can be operated upon. If the ear in one groove of cylinder A should be longer than that in the other, the bars will be stopped, owing to slots y, at different points, and the bell-cranks will then pose differently from what they would if the centering-bars had the same stroke. The slots y in the ends of rods x are to admit of this difference. A pin, z, projects from the side of cam J and works in the slot in the connecting-rod j. (See Figs. 1, 5, and 11.) The other end of this rod connects with an arm of the toothed segment e. A pinion, 5, fits loosely on the end of shaft P, and gears into segment e, and to this pinion is pivoted the ratchet-pawl g. The ratchet-notched wheel k (shown in Figs. 2 and 5) is keyed to the shaft P between the pinion 5 and frame L$^2$, and contains four notches and four ratchet-teeth. The lock-pawl h is pivoted to frame L$^2$. A pawl, e$^2$, is pivoted to segment e, for the purpose of moving the lock-pawl h out previously to the revolution of the cylinder A.

In operation the pin z reaches the inner end of the slot in the connecting-rod j just after the cam J has moved the centering-bars out, and pushes the said rod, thereby causing the segment e to descend. In doing so the pawl e$^2$ moves the lock-pawl h out of the notch. Then pawl g engages one of the ratchet-teeth, and the cylinder A is caused to move through one-fourth of a revolution. The pawl h, which has been released, then falls into a notch and secures the cylinder while the cutters are operating, and the segment e is being moved back by the pin z pressing against the outer end of the slot in connecting-rod j. The grooved cylinder A is secured to shaft P, and can have any number of grooves m; but I prefer four, as this number admits a maximum capacity with a minimum diameter of cylinder. The grooves m run parallel with the axis of the cylinder, and their sides are planes oblique to that passing through and parallel with the axis of the cylinder. The grooves m are of sufficient size to allow the largest ear of corn to lie wholly and freely within them. To the end of each of the grooves nearest the center cutter is fixed a concave shield, d, having a hole in the center to allow the center cutter, F, to pass through it and operate on the butt of the ear to be cut.

I have a special reason for making the sides of the grooves m abnormal to the periphery of the cylinder, as their obliquity forms inclined planes which facilitate the gravitating of ears from the hopper G into the grooves m, and also allows the ears to gravitate freely against the cleaning-cylinder C while being denuded of their husks.

The cleaning or husking cylinder C is preferably made of wood, and has inserted into its perimeter a number of elastic strips which project beyond its surface.

In order for the cleaning-cylinder to do its required amount of work in the allotted time, it requires a rapid rotation, and any hard or inelastic substance on the cylinder will shell or abrade the corn. I use laminated canvas and rubber, as being the most convenient and durable material possessing the required properties. The brush D is used in conjunction and in contact with the cleaning-cylinder C, and has a greater circumferential velocity than cylinder C, which causes the husks and other refuse to be thrown away from the machine, and prevents cylinder C becoming clogged. The greater circumferential velocity of the brush is attained by making it larger in diameter than the cylinder C, but they may be made the same diameter and the different velocities attained by varying the size of the pulleys 2 and 3. The center cutter, F, consists of a small shaft, 12, arranged to have both a rotary and a longitudinally-reciprocating motion. This shaft works through a sleeve, 6, which is journaled in frame L. (See particularly Figs. 2 and 8.) The end of the shaft 12 nearest the grooved cylinder is constructed with a head to receive a number of knife-like blades, 13, and is made larger in diameter one way than the other. By fixing the blades on either the larger or smaller diameters they are made to describe, in revolving, circles of different diameters. The blades are secured to the head of the shaft 12 by screws 14, (see Fig. 9,) and they may be readily replaced when required. It is always intended that this cutter shall make an incision through the husks around the stem, and between it and the grain. The centering-bars B B² are preferably made of wood, and cylindrical in form. The ends nearest the grooved cylinder are made concave to receive the points of the ears, and bar B is provided with four springs, $b$. These springs are arranged parallel with the axis of the bar. One end of each spring is secured to the circumference of the bar, while the other end is free to bend in toward its axis. The free ends of each pair of diametrically-opposite springs are connected by a band, $f$, which bends into the concavity of the bar. These bands are made of any flexible material and are attached to the springs by rivets. The bars are forced in by weights $n$, and the pressure of the point of the ear on the bands $f$ causes them to be forced into the concavity, thereby drawing down the ends of the springs, clasping the ear, and resisting the turning which the center cutter has a tendency to produce. Levers or equivalent devices may be employed to effect the same purpose, but I prefer springs, as being the most effective and convenient. The outer ends of the bars have mortises 4 for the ends of the bell-cranks to work in. The knife E, or stem-cutter, is a plate of thin steel, and is secured to cog-wheel Z on the cam-shaft N. In rotating, the knife passes across the hole in the concave shield $l$, in the end of the hopper G, and also across the hole in the concave shield $d$, that may be, with the groove $m$, at the bottom of the hopper. The hopper G is a box formed between the frames L L². The sides of the box converge toward each other at the bottom, leaving an opening of sufficient size to permit the largest ear of corn to pass through into a groove, $m$. The opening in the bottom of the hopper is made to coincide with a groove, $m$, in the cylinder A, when the latter is locked in position by the pawl $h$ being in a notch. The upper extremity of bell-crank I enters a mortise, 4, in the outer end of centering-bar B, and is connected to the latter by a pin passing through it and a slot in the end of the bell-crank. Bell-crank I² and centering-bar B² are connected in a similar manner. On the other extremities of the bell-cranks are weights $n$. The ears of corn are thrown by hand into the hopper G, with the butts toward the right side of the machine. If an ear has an unusually long and crooked stem, it is first thrust by hand through the hole in the concave shield $l$, and has a portion of the stem removed by the rotating cutter E. It is then let go and falls into the hopper.

In operation the direction of motion is that indicated by the arrows. The ear gravitates from the hopper G into a groove, $m$, in the cylinder A. The part of the cam J having the greatest radius leaves the roller in the end of lever $i$, and allows the weights $n$ to descend and drive the centering-bars B and B² into the grooves $m$. The bar B² then encounters the ear and drives the butt into and the stem through the hole in concave shield $d$. The knife E now passes the shield and shears off the stem projecting through it. The centering-bars B B² are, in the manner before described, thrown out by the cam J, and through the combined operation of pin $z$, slotted connecting-rod $j$, segment $e$, pinion 5, ratchet-notched wheel $k$, and pawls $e^2$, $g$, and $h$, as before described, the cylinder A is made to turn through one-fourth of a revolution and be locked. Another ear now falls into a groove, $m$, at the bottom of the hopper G and the previous operation is repeated, while the first ear, which has arrived on a line with centering-bar B, is undergoing the following operation: The two centering-bars being worked together, the bar B enters the groove and centers the first ear by forcing the butt into the concave shield $d$ and the point into the concavity of the centering-bar. The center cutter, F, being rotated by the belt $q$, is now moved in, as before described, by cam O, and passes through the hole in shield $d$, and makes an annular incision between the stem and grain, effectively severing the husk from the stem. The depth to which the cutter enters is regulated by adjusting the connection of rod $v$ with slotted crank $u$. (See Fig. 8.) The center cutter, F, has a tendency to turn the ear in the groove, but the springs $b$ in the centering-bar, being drawn down by the pressure of the point of the ear on their connecting-bands $f$, clasp the ear, like fingers, and prevent its turning. During the withdrawing of the bar the pressure is relieved and the springs resume their normal position, releasing the ear which is left in the groove. The center cutter, F, is moved out just before the centering-bars are. The cylinder A, which begins to turn immediately after the centering-bars and center cutter are thrown out, now makes, by the means before described, another quarter-revolution, and while the two previous operations are being repeated the first ear is being subjected to the cleaning process. The sides of the grooves $m$ forming incline planes, allow the ear to remain in free contact with the cleaning-cylinder C, which, in revolving, removes the husks from the ear. When the husks arrive at the point of contact of the cleaning-cylinder C with the brush D, the latter, by reason of its greater circumferential velocity, throws them off on a line tangential to the point of contact. The cylinder A is now made to turn through another fourth of a revolution, and while the previous operations are being repeated the cleaned ear is discharged down the guide $a$ into whatever receptacle is provided.

The machine is thoroughly automatic, the corn requiring no handling from the time it is dropped into the hopper to its being discharged thoroughly cleaned. Moreover, the combination of the centering-bars with the perforated concave shields enables any sized ear of corn to be taken up and centered between them.

I make no special claim to the cleaning-cylinder C, as cylinders having elastic projections are old; moreover, they may be made in a great variety of ways. They can be prismatic as well as cylindrical in figure, and may have the elastic projections either inserted into the body or fixed on the surface of the figure.

I am also aware that revolving brushes are employed to clean saws or belts provided with teeth; but these are instances where the brush acts conjointly, and in contact with moving devices provided with inelastic projections—conditions inadmissible in my invention.

I claim—

1. In a corn-husking machine, the combination of a carrying device, a reciprocating centering-bar, and a perforated concave shield, the said bar being adapted to engage the ear at the point and the shield at the butt, and means for effecting an incision through the husk, substantially as described.

2. In a corn-husking machine, a carrying device, a reciprocating centering-bar, and a perforated concave shield, in combination with a cutter having a rotary and reciprocating motion, the latter being adjustable to regulate the depth and diameter of the annular incision, substantially as set forth.

3. In a corn-husking machine, a carrying device, and a reciprocating centering-bar provided with means, substantially as described, for clasping the ear at the point and holding the same, in combination with a rotary cutter, as and for the purpose set forth.

4. In a corn-husking machine, a carrying device, and a centering-bar automatically adjustable to ears of various lengths and adapted to hold the ear at the point, in combination with a rotary cutter for severing the stem, substantially as described.

5. In a corn-husking machine, a carrying device combined with an automatically-adjustable centering-bar, the adjustment of which is determined by the length of the ear operated upon, substantially as described.

6. In a corn-husking machine, a carrying device, reciprocating centering-bars, one of which has a concave end, and means for holding the ear at the point, in combination with a concave shield for holding the ear at the butt, and cutters for severing the stem and husk, substantially as set forth.

7. In a corn-husking machine, a carrying device with longitudinal grooves, and means for holding the ear at the point, in combination with perforated concave shields and suitable cutters, substantially as shown and described.

8. The combination of the grooved carrying device, the reciprocating centering-bar, a cutter, and means for imparting to the cutter a rotary and a reciprocating motion, substantially as described.

9. The combination of the grooved carrying device, a cleaning-cylinder having elastic projections, and a brush revolving at a higher velocity than the cylinder and in peripheral contact therewith, substantially as described.

10. In a corn-husking machine, a grooved carrying device, a cylinder having elastic projections, and a brush revolving at a higher velocity than the cylinder and in peripheral contact therewith, in combination with an inclined plane located between the cylinder and brush, substantially as specified.

11. In a corn-husking machine, the combination of a feeding-hopper, a grooved carrying device provided with perforated concave shields, and means for severing the husk and removing the same, substantially as set forth.

12. In a corn-husking machine, a revolving cutter provided with blades adapted to be adjusted to cut incisions of different diameters, substantially as shown.

13. In a corn-husking machine, a revolving shaft provided with a head having projections and recesses, in combination with removable cutters, and means for securing the same to the head, substantially as shown.

14. The combination of the feed-hopper, the grooved carrying device, the automatically-adjustable centering-bars, and the cutters operating at right angles to each other, substantially as specified.

15. The combination of the feed-hopper, the grooved carrying device, the automatically-adjustable centering-bars, the cutters for removing the stem and severing the husk, and the cylinder provided with elastic projections, substantially as set forth.

16. The combination of the feed-hopper, the grooved carrying device, the adjustable centering-bars, the cutters for removing the stem and severing the husk, the cylinder provided with elastic projections, and the brush revolving in contact with said elastic projections, substantially as described.

ISAAC McKIM CHASE.

Witnesses:
GEO. W. WELLS,
HENRY L. WELLS.